(12) United States Patent
Renaud

(10) Patent No.: US 9,285,494 B2
(45) Date of Patent: Mar. 15, 2016

(54) METHOD FOR MANAGING SHOTS IN A MULTI-VESSEL SEISMIC SYSTEM

(71) Applicant: SERCEL, Carquefou (FR)

(72) Inventor: Didier Renaud, Nantes (FR)

(73) Assignee: SERCEL, Carquefou (FR)

( * ) Notice: Subject to any disclaimer, the term of this patent is extended or adjusted under 35 U.S.C. 154(b) by 281 days.

(21) Appl. No.: 14/092,416

(22) Filed: Nov. 27, 2013

(65) Prior Publication Data

US 2014/0146638 A1 May 29, 2014

(30) Foreign Application Priority Data

Nov. 28, 2012 (EP) .................................... 12306473

(51) Int. Cl.
*G01V 1/38* (2006.01)

(52) U.S. Cl.
CPC .................................... *G01V 1/3808* (2013.01)

(58) Field of Classification Search
CPC .................................................. G01V 1/3808
USPC ........................................................... 367/15
See application file for complete search history.

(56) References Cited

U.S. PATENT DOCUMENTS

| 2007/0159921 A1 | 7/2007 | Regone et al. |
| 2012/0221182 A1 | 8/2012 | Holo et al. |

FOREIGN PATENT DOCUMENTS

| EP | 0577364 A2 | 5/1994 |
| WO | 98/18181 A1 | 4/1998 |
| WO | WO 9819181 A1 * | 5/1998 | ........... G01V 1/3808 |

OTHER PUBLICATIONS

European Search Report and Written Opinion dated Feb. 22, 2013 for corresponding European Patent Application No. 12306473, filed Nov. 28, 2012.

* cited by examiner

*Primary Examiner* — Daniel L Murphy
(74) *Attorney, Agent, or Firm* — David D. Brush; Westman Champlin & Koehler, P.A.

(57) ABSTRACT

Method for managing shots in a multi-vessel seismic system, including for each slave shooter vessel: a) computing first theoretical shot times, based on a speed a scheduler shooter vessel and shot points associated to the scheduler shooter vessel, associated next shots of the scheduler shooter vessel; b) computing, based on a speed of the slave shooter vessel and the shot points, second theoretical shot times associated to the next shots; c) computing, based on the first theoretical shot times, interpolated virtual shot times; d) computing, based on the first theoretical shot times, the interpolated virtual shot times and a minimum shot time interval, shooting time windows; e) for each next shot: if the second theoretical shot time is in the shooting time window, selecting as a predicted shot time the second theoretical shot time; otherwise, selecting a border of the shooting time window closest to the second theoretical shot time.

11 Claims, 11 Drawing Sheets

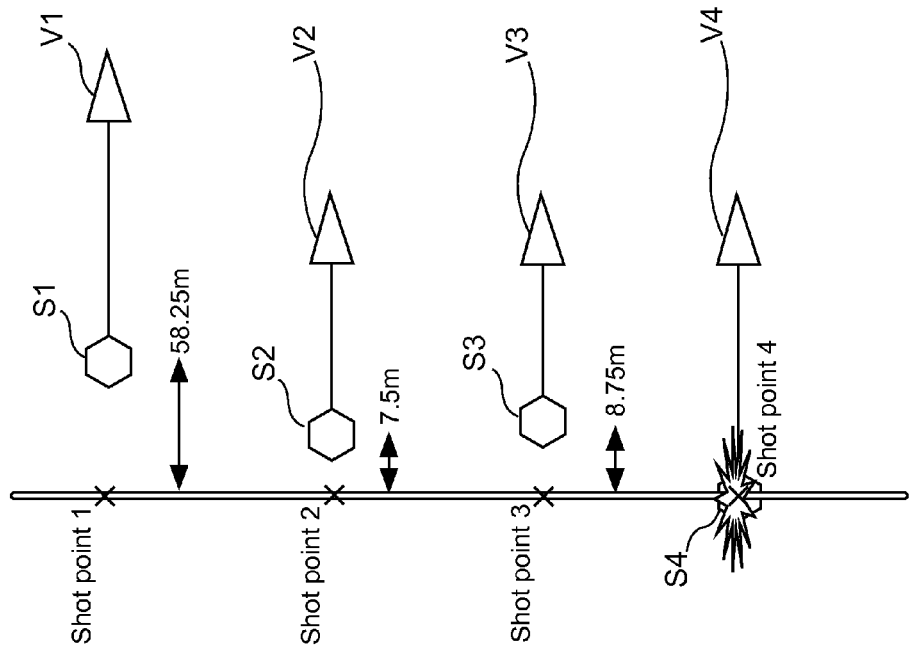
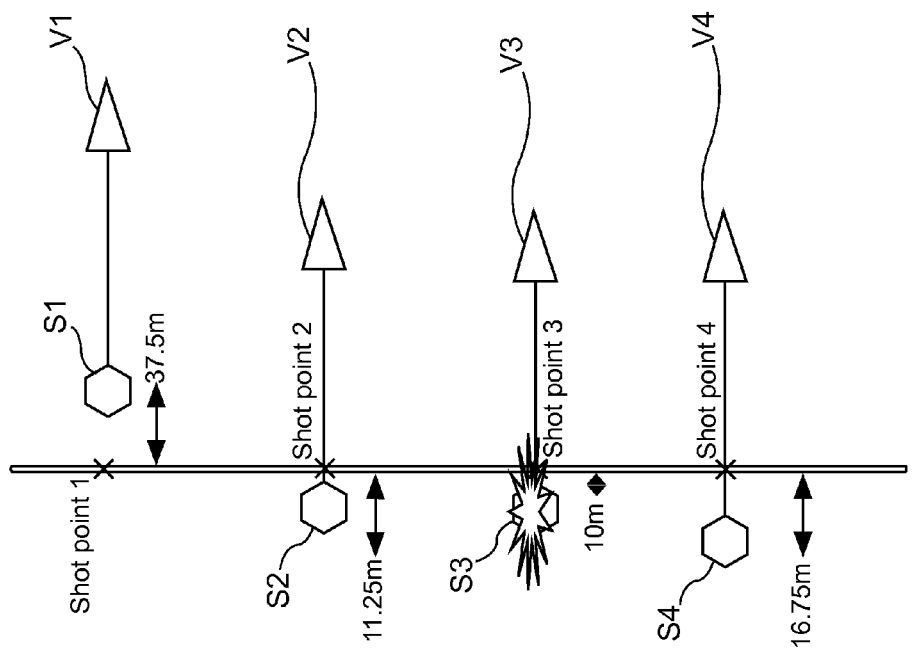
Fig. 3C
Fig. 3B

METHOD FOR MANAGING SHOTS IN A MULTI-VESSEL SEISMIC SYSTEM

1. FIELD OF THE INVENTION

The field of the invention is that of geophysical data acquisition.

More precisely, the invention relates to marine seismic acquisition involving several vessels to achieve an imaging of the seabed earth crust.

In particular, the invention relates to a method for managing shots in a multi-vessel seismic system comprising several shooter vessels (a scheduler shooter vessel and at least one slave shooter vessel) and at least one listener vessel. Each shooter vessel comprises at least one seismic source performing shots at determined instants. Each listener vessel has a recording system and tows at least one streamer integrating seismic sensors.

In practice, a multi-vessel seismic system often comprises several shooter vessels and several listener vessels. Moreover, some vessels can be both a shooter vessel and a listener vessel.

The present invention can be applied notably to the oil exploration industry, but may also be applied to any field using a geophysical data acquisition network in a marine environment.

2. TECHNOLOGICAL BACKGROUND

2.1 Principle of a Seismic Marine Acquisition

To perform a seismic marine acquisition in a survey area, it is common to use seismic sources (guns, vibratory sources, . . . ) and seismic sensors. The sensors are housed in cables, called streamers (or linear antennas). Several streamers are used together to form an array of thousands of sensors. Sources are towed by one or several shooter vessels, and streamers are towed by one or several listener vessels. A same vessel can be both shooter vessel and listener vessel (i.e. can tow one or several streamers and one or several seismic sources).

To collect the geophysical data in the marine environment, the seismic sources (towed by at least one shooter vessel) are activated to generate single pulses or continuous sweep of energy. The signals generated by each source travels through the layers of the earth crust and the reflected signals are captured by the sensors (hydrophones) in the streamers (towed by at least one listener vessel).

After each shot, two files are created: a first file containing seismic data provided by seismic sensors (comprised in seismic streamers); and a second file, called RH file (for "record header"), containing information about the shot on shooter vessel (gun header (GH), real shot time (FTB, for "Field Time Break") and source position (SP) at shot time). These first and second files are then combined to form a complete third file (also called SEG-D file). The interpretation of the seismic data contained in the SEG-D files is used to compute a 3D image of the earth crust.

Each theoretical location, where a seismic source must shoot, is a shot point location (also referred to as "shot point"), defined by its geographical coordinates (latitude/longitude and/or easting northing). When the source reaches this shot point, the gun is activated and produces an explosion. The set of shot points of all seismic sources is called "preplot".

The acquisition process is controlled and monitored by a navigation system (also referred to as INS, for "Integrated Navigation System"), which is onboard a master vessel (also referred to as "master speed vessel") and whose role is to compute position of sensors and sources, drive vessels along their acquisition path, according to the preplot geometry, and to activate sources to perform seismic acquisition at desired location (shot points).

The navigation system determines the moment of firing for each shot point, according to the positions of the various system components. This moment, also referred to as "shot time", is often noted T0.

The actual positions of all equipments (hydrophones and guns) are known thanks to well-known measure means (GPS, RGPS, acoustics, compasses, depth sensors . . . ).

2.2 Multi-Vessel Operation

To further increase the quality of seismic imaging, the seismic surveys are now performed in multi-vessel operation, in order to obtain a wide azimuth illumination of the earth's crust (this explaining why, in this case, the preplot is referred to as "wide azimuth preplot" or "WAZ preplot"). A multi-vessel seismic system often comprises several shooter vessels and several listener vessels. A same vessel can be both shooter vessel and listener vessel.

The wide azimuth preplot defines a sequence of shot points, where the shots of the various vessels are interlaced.

The shooting order of the sources, and consequently of the vessels, is also defined in the wide azimuth preplot. The shooting order of the vessels must be respected and performed as close as possible to the geographic coordinates of the shot points specified in the wide azimuth preplot. So that the shooting order is complied, the various vessels must be synchronized.

In the simplified example of wide azimuth preplot of FIG. 4, there are three shooter vessels V1, V2 and V3, each towing a source S1, S2 and S3 respectively. We assume the shooter vessel V1 is the master speed vessel. We also assume that the rank of a shot is identical to the rank of the corresponding shot point (for example, the seventh shot is called "shot 7" and must be made at "shot point 7"). This example of wide azimuth preplot can be resumed as follows:

the shooter vessel V1 is in charge of shot 1, shot 4, shot 7, shot 10, shot 13, etc, which must be carried out respectively at shot point 1, shot point 4, shot point 7, shot point 10, shot point 13, etc;

the shooter vessel V2 is in charge of shot 2, shot 5, shot 8, shot 11, etc, which must be carried out respectively at shot point 2, shot point 5, shot point 8, shot point 11, etc; and the shooter vessel V3 is in charge of shot 3, shot 6, shot 9, shot 12, etc, which must be carried out respectively at shot point 3, shot point 6, shot point 9, shot point 12, etc.

In this example, the three shooter vessels V1, V2 and V3 are supposed to be aligned, but the three shot points corresponding to three successive shots (each carried out by a different one the three shooter vessels) are not aligned (e.g. shot points 1, 2 and 3 are not aligned). However, and as shown in FIG. 4, we assume shooter vessel V2 is ahead and shooter vessel V3 is late.

We present now the calculation of a theoretical shot time associated with a shot point.

For each seismic source, a path (also referred to as "sail line" or "navigation line") is defined, which passes through <<waypoints>>, including the shot points associated with this seismic source.

The projection, on this path, of the speed of a given point X (e.g. a reference point of the seismic source) is called "speed along" (and noted SA(X)).

The distance between two points X and Y projected on this path is called "distance along" (and noted DA(X,Y)).

The point used to compute the theoretical shot time (T0) is called "predict point" (and noted PP). It can be a reference point located on the seismic source or on the shooter vessel which tows this seismic source.

For a given seismic source S and a given predict point PP, the theoretical shot time T0 associated with a given shot point SP is computed according to the following formula:

$$T0=(DA(SP,PP)/SA(PP))+\text{current time}$$

For example, in FIG. 4, for the seismic source S1 and a given predict point PP corresponding to a reference point of the seismic source S1, the theoretical shot time T0 associated with the "shot 7" is computed according to the following formula (also referred to as "calculation in distance mode"):

$$T0(\text{shot }7)=(DA(\text{"shot point 7"},PP)/SA(PP))+\text{current time}$$

It must be noted that DA("shot point 7", PP) is noted $DA_1$ in FIG. 4.

2.3 Definitions

Bull's Eye (noted BE): a master vessel is a reference for other vessels (slave vessels). A point of the master vessel (or of any equipment associated with the master vessel, e.g. a source) is used as reference point to calculate the ideal position of other vessels (slave vessels), i.e. for space synchronization of the slave vessels.

The ideal position of a slave vessel is indicated by a circular target called "bull's eye" (BE), having:

a center which depends on the projection of the master vessel's reference point on the sail line of the slave vessel. In the particular case where the slave shooter vessels are supposed to be aligned with the master vessel (see FIG. 4), the center of the "bull's eye" is coincident with the projection of the master vessel's reference point on the sail line of the slave vessel. In the particular case where the shooter vessels are not supposed to be aligned (see FIGS. 1, 2A-2D and 3A-3C), there is a predetermined offset, along slaves vessels sail line, between the center of the "bull's eye" and the projection of the master vessel's reference point on the sail line of the slave vessel. For example, in FIG. 1, this offset is equal to 18.75 m for the "bull's eye" of the slave shooter vessel V2, 37.5 m for the "bull's eye" of the slave shooter vessel V3 and 56.25 m for the "bull's eye" of the slave shooter vessel V4; and a radius of tolerance which can be determined by contract requirements (e.g. 10 m).

A reference point of the slave vessel, defined in advance, must be located in the "bull's eye" to ensure proper synchronization of the slave vessel. In the example of FIG. 4, the shooter vessel V1 is the master vessel. The ideal position of the slave shooter vessel V2 is indicated by a circular target ("bull's eye") noted $BE_2$. The ideal position of the slave shooter vessel V3 is indicated by a circular target ("bull's eye") noted $BE_3$.

Bull's Eye Distance Along (noted BE DA): for a slave shooter vessel, it is the distance between the center of the bull's eye and the reference point of this slave shooter vessel, projected on the path (sail line) of this slave shooter vessel. In the example of FIG. 4, the "Bull's Eye Distance Along" of the slave shooter vessel V2 is noted $BE\ DA_2$. The "Bull's Eye Distance Along" of the slave shooter vessel V3 is noted $BE\ DA_3$. The aforesaid condition that "the reference point of the slave vessel must be located in the "bull's eye" to ensure proper synchronization of the slave vessel", can also be expressed as "the Bull's Eye Distance Along (BE DA) should be less than or equal to the radius of tolerance of the "bull's eye" (BE)".

Theoretical shot spacing: it is the theoretical distance along between two consecutive shot points. Basically, each real distance along between two shot points should be close to it. In other words, the theoretical shot spacing is the distance between two theoretical shots along the line of the master. For example if master vessel has to shot the shot point N and the shot point N+4, and slave vessels have to shot the points N+1, N+2 and N+3, we have: theoretical shot spacing=distance(shot point N, shot point N+4)/(4−0).

Shot time interval (noted STI): it is the real time interval between two shots.

Minimum Shot Time Interval (noted "Min STI", and also called "Minimum shot cycle time"): it is the minimum time interval that must be maintained between two successive shots to avoid any interference. If this value is not respected, there is a shot overlap and the two shots are not considered valid.

2.4 Known Methods for Shot Overlap Avoidance 2.4.1 FIG. 1 shows an ideal scenario in a particular context defined as follows: there are four shooter vessels V1, V2, V3 and V4, each towing a source S1, S2, S3 and S4 respectively. We assume the shooter vessel V1 is the master speed vessel. We also assume that the rank of a shot is identical to the rank of the corresponding shot point (for example, the fourth shot is called "shot 4" and must be made at "shot point 4"). We also assume a theoretical shot spacing equal to 18.75 m.

For simplicity, only the first four shot points (shot point 1 to shot point 4) are illustrated:

the shooter vessel V1 is in charge of shot 1, to be carried out at shot point 1. The realization of this first shot is symbolized by the term "bang" in FIG. 1;

the shooter vessel V2 is in charge of shot 2, to be carried out at shot point 2;

the shooter vessel V3 is in charge of shot 3, to be carried out at shot point 3;

the shooter vessel V4 is in charge of shot 4, to be carried out at shot point 4.

In this example, the four shot points (shot 1 to shot 4) are supposed to be aligned, but the four seismic sources S1 to S4 (and therefore the four shooter vessels V1 to V4) are not aligned.

If we achieve a situation where each slave shooter vessel remains at a constant speed in relation to the master shooter vessel (keeping the inline distance between the sources constant) and where there are no communication outages between the slave shooter vessels and the master shooter vessel, then there is no problem (shots 2, 3 and 4 are actually carried out at shot points 2, 3 and 4 respectively). However, this is unrealistic.

2.4.2 Referring now to FIGS. 2A to 2D, we present a first known method for managing shots in a multi-vessel seismic system comprising several shooter vessels (a scheduler shooter vessel and at least one slave shooter vessel) and at least one listener vessel.

This first known method allows to minimize the "Distance Along" (DA) error on shot locations (i.e., for a given shot by a slave shooter vessel, the distance between the theoretical shot point and the location where the shot was actually made, projected on the sail line of the slave vessel).

In this first known method, the navigation system (INS) fires the sources based on the along line progress of the slave shooter vessels V2, V3 and V4.

As shown in FIG. 2A, we assume that the master shooter vessel V1 shoots normally when it is on the shot point 1, the slave shooter vessel V2 is late and falls 30 m behind its "bull's eye" (48.75 m between the source S2 and the shot point 2, instead of 18.75 m in FIG. 1), and the slave shooter vessel V3 is late and falls 10 m behind its "bull's eye" (47.5 m between the source S3 and the shot point 3, instead of 37.5 m in FIG. 1).

As shown in FIG. 2B, when the master shooter vessel V1 has moved forward 47.5 m, the slave shooter vessel V3 (and more precisely its source S3) reaches the shot point 3 before the slave shooter vessel V2 (and more precisely its source S2) reaches the shot point 2. In theory, the slave shooter vessel V3 should fire its source S3 (since the source S3 is located at the shot point 3), but in reality, the navigation system (INS) of the master shooter vessel V1 assumes the slave shooter vessel V2 is next to fire (1.25 m from shot point 2), and decides there is no shot for the slave shooter vessel V3, at the shot point 3.

As shown in FIG. 2C, when the master shooter vessel V1 has moved forward 48.75 m, the slave shooter vessel V2 (and more precisely its source S2) reaches the shot point 2. The slave shooter vessel V2 then eventually fires, but over a full shot cycle later than planned. It must be noted that the slave shooter vessel V4 will reach its shot point 4 in 7.5 m, i.e. around 4 seconds.

As shown in FIG. 2D, when the master shooter vessel V1 has moved forward 56.25 m, the slave shooter vessel V4 (and more precisely its source S4) reaches the shot point 4. The navigation system (INS) of the master shooter vessel V1 can be configured either to fire the shot for the slave shooter vessel V4, or to inhibit the shot for the slave shooter vessel V4 (considering it is too close (4 seconds) from the record for the shot of the slave shooter vessel V2).

The entire issue of FIGS. 2A to 2D will repeat whilst the slave shooter vessel V2 stays out of position.

These FIGS. 2A to 2D demonstrate the complexity of the issue when trying to fire each source exactly on its preplot targets (i.e. exactly on the shot points associated to this source).

As detailed above, the drawbacks of this first known method are:
- missed shots due to slave shooter vessel being out of position (e.g. in FIG. 2B, no shot for the slave shooter vessel V3 due to slave shooter vessel V2 out of position); and
- shot overlap due to shots fired in the middle of the important part of a record from a previous shot (e.g. in FIG. 2D, the shot of the slave shooter vessel V4 is close to the record relating to the shot of the slave shooter vessel V2).

In an alternative embodiment of this first known method, the navigation system (INS) also checks whether the condition "BE DA≤BE radius" is satisfied. This ensures a suitable shot time interval (STI), while guaranteeing the firing order if the BE radius is adapted to the speed of the sources (i.e. if the BE radius is not too long compared to the speed of the vessels). With this alternative embodiment, the source S2 (of slave shooter vessel V2) would not have done its shot (because: BE $DA_2$=30 m>BE radius=10 m) and the source S3 (of slave shooter vessel V3) would have done its shot (because: BE $DA_3$=10 m<=BE radius=10 m).

2.4.3 Referring now to FIGS. 3A to 3C, we present a second known method for managing shots in a multi-vessel seismic system comprising several shooter vessels (a scheduler shooter vessel and at least one slave shooter vessel) and at least one listener vessel.

This second known method allows to fire the sources as a function of the along line progress of the master shooter vessel. The shots of each shot point are done whatever the location of the shooter and without taking account of the DA error. In other words, this second known method proposes to change the operation mode of the navigation system (INS) of the master shooter vessel V1. More precisely, the navigation system (INS) fires the sources based only on the along line progress of the master shooter vessel V1, without checking whether the condition "BE DA≤BE radius" is satisfied. The real shot times of the slave shooter vessels V2, V3 and V4 are set to theoretical shot times predicted by the navigation system (INS) of the master shooter vessel V1 (regardless of the actual position of slave shooter vessels).

We assume the same scenario as in FIG. 2A: the master shooter vessel V1 shoots normally when it is on the shot point 1, the slave shooter vessel V2 is late (30 m behind its "bull's eye") and the slave shooter vessel V3 is late also (10 m behind its "bull's eye").

As shown in FIG. 3A, when the master shooter vessel V1 has moved forward 18.75 m, the slave shooter vessel V2 has its source S2 fired, even though the slave shooter vessel V3 is ahead of the slave shooter vessel V2. This means that the slave shooter vessel V2 fires "out of position", by 30 m (from the shot point 2) in this case, but the operational concerns of first known method disappear (no missing shots).

As shown in FIG. 3B, when the master shooter vessel V1 has moved forward another 18.75 m, the slave shooter vessel V3 has its source S3 fired unlike in the first scenario of FIGS. 2A to 2D), being "out of position" only by 10 m (from the shot point 3).

As shown in FIG. 3C, when the master shooter vessel V1 has moved forward another 18.75 m, the slave shooter vessel V4 has its source S4 fired.

A drawback of this second known method is that the slave shooter vessels can miss their shot points, i.e. their inline targets (e.g. in FIG. 3A the slave shooter vessel V2 fires "out of position" by 30 m, and in FIG. 3B the slave shooter vessel V3 fires "out of position" by 10 m).

2.4.4 Other drawbacks common to the first and second known methods

In aforesaid first and second known methods, the shooting management is centralized in the navigation system (INS) of the master shooter vessel. The latter makes all the decisions and sends activation signals (shoot commands) to the slave shooter vessels, in order to command the firing of the various shots carried out by the slave shooter vessels. In practice, these activation signals are comprised in a flow of information which is exchanged in real time via a radio link (wireless channels) between the master shooter vessel and the slave shooter vessels.

A drawback of the radio link is that it is not 100% reliable due to fading, long distances between vessels, multipath and floating obstructions, etc. In other words, during a seismic survey, the radio link between the vessels can be lost or down (broken). If this happens when a shoot command is transmitted to the slave vessel's source, the shoot command will not be received, the shot will not be made, and the vessels will miss a spot (shot point) where data are required.

Another drawback of the radio link is that it requires regular calibration. Calibration is normally carried out "off-line," the result of which is that timing errors may occur between calibrations, these timing errors being undetected.

3. SUMMARY OF THE INVENTION

A particular embodiment of the invention proposes a Method for managing shots in a multi-vessel seismic system comprising a scheduler shooter vessel and at least one slave shooter vessel, wherein it comprises, for each said slave shooter vessel:

a) computing a series of first theoretical shot times, as a function of a speed value of the scheduler shooter vessel and shot points associated to the scheduler shooter vessel, each first theoretical shot time being associated to one of the next shots of the scheduler shooter vessel;

b) computing, as a function of a speed value of the slave shooter vessel and shot points associated to the slave shooter vessel, a series of second theoretical shot times each associated to one of the next shots of the slave shooter vessel;

c) computing, as a function of the series of first theoretical shot times, a series of interpolated virtual shot times comprising at least the interpolated virtual shot times associated to the shots immediately before and after the next shots of the slave shooter vessel;

d) computing, as a function of the series of first theoretical shot times, the series of interpolated virtual shot times and a minimum shot time interval, shooting time windows each associated to one of the next shots of the slave shooter vessel;

e) for each next shot of the slave shooter vessel:
    if the associated second theoretical shot time is in the associated shooting time window, selecting as predicted shot time the associated second theoretical shot time;
    otherwise, selecting as predicted shot time the border of the associated shooting time window which is the closest from the associated second theoretical shot time.

Thus, this particular embodiment relies on a wholly novel and inventive approach in which, for each shot, we compute a shooting time window (depending, inter alia, of the first theoretical shot times) and a second theoretical shot time, and we compare them to decide which predicted shot must be used:
    if the second theoretical shot time is in the shooting time window, this means the slave shooter vessel is well aligned with preplot, and it can shoot at the second theoretical shot time, i.e. in "distance mode". The "Distance Along" error will be close to zero, and the shot point will be best matched;
    if the second theoretical shot time is not in the shooting time window, this means the slave shooter vessel is not well aligned with preplot, and it can shoot but at an appropriate border of the shooting time window, i.e. in "time mode", and not at the second theoretical shot time, i.e. not in "distance mode". The "Distance Along" error will be the best possible, and the shot point will not be matched.

Thus, there is no missed shot, even though the slave shooter vessels are not well aligned with the preplot, and the "Distance Along" (DA) error on shot locations is minimized.

According to a particular feature, the method comprises:

f) when a previous shot n−1 has been carried out and the slave shooter vessel is in charge of a next shot n:
    if a time interval, between a final shot time for the previous shot n−1 and the predicted shot time for the next shot n, is greater than or equal to the minimum shot time interval, selecting, as final shot time for the next shot n of the slave shooter vessel, the predicted shot time for the next shot n;
    otherwise, selecting, as final shot time for the next shot n of the slave shooter vessel, the final shot time for the previous shot n−1 plus the minimum shot time interval.

Thus, there is no shot overlaps.

According to a particular feature, said multi-vessel seismic system comprises a master speed vessel, and:

if the master speed vessel is a shooter vessel, the scheduler shooter vessel is the master speed vessel;

otherwise, the scheduler shooter vessel is the shooter vessel having the smallest bull's eye distance along.

Thus, the scheduler shooter vessel is usually the master speed vessel, which simplifies the implementation of the proposed technique.

According to a particular feature, if a determined condition is verified, the method further comprises:

computing a virtual shot predict point which is used instead of a real shot predict point, in step a), to compute the series of first theoretical shot times.

The principle is to introduce deliberately an error in the series of first theoretical shot times (using a virtual shot predict point instead of a real shot predict point), in order to shift the shooting time windows. Thus, the "Distance Along" (DA) error on shot locations, for the slave shooter vessels, is further reduced, in the case where the second theoretical shot time is not in the shooting time window.

According to a particular feature, said multi-vessel seismic system comprises a master speed vessel, and the determined condition is:

|Mean BE DA|>"overlap tolerance", with:
    |Mean BE DA| the absolute value of "Mean BE DA", "Mean BE DA" being defined as:
        the mean value of the "bull's eye distance along" of the slave shooter vessels comprised in said multi-vessel seismic system, if the master speed vessel is a shooter vessel, or
        the mean value of the "bull's eye distance along" of the slave shooter vessels, minus the "bull's eye distance along" of the scheduler shooter vessel, if the master speed vessel is not a shooter vessel;
    "overlap tolerance"=X−(Y*Z), with:
        X a theoretical shot spacing;
        Y the minimum shot time interval;
        Z the speed along, determined at the real shot predict point of the scheduler shooter vessel.

Thus it is easy to decide whether it is appropriate to introduce an error in the prediction of the scheduler shooter vessel.

In a first particular implementation, the scheduler shooter vessel carries out step a) and then a further step a') of sending the series of first theoretical shot times to the at least one slave shooter vessel, and the slave shooter vessel carries out a further step b') of receiving the series of first theoretical shot times and then said step b) to e), and f) if f) is carried out.

This is a decentralized implementation. Each slave shooter vessel is autonomous in terms of shot decisions. Moreover, since the slave shooter vessel receives a series of first theoretical shot times, it can continue to operate even in case of a temporary loss of a radio link with the scheduler shooter vessel.

The operation of the scheduler shooter vessel is reduced. It computes and sends only the series of first theoretical shot times relating to its own shots (instead of shoot commands relating to the shots of all slave shooter vessels, in the prior art solutions).

According to a particular feature, the scheduler shooter vessel carries out the steps a) and a') iteratively, resulting in the successive sending to the slave shooter vessel, via a radio link, of a plurality of series of first theoretical shot times which are updated successively in time.

This allows to optimize the operation of the system, in case of a temporary loss of a radio link with the scheduler shooter vessel.

According to a particular feature, if the scheduler shooter vessel detects the radio link is unusable, the scheduler shooter vessel ceases to generate new updated series of first theoretical shot times and performs the next shots according to a last generated series of first theoretical shot times, until the radio link is usable again.

Thus it is possible to compensate for a time shift which could occur during the lapse of time of the radio link cut.

In a second particular implementation, the scheduler shooter vessel carries out steps a) to e), and f) if f) is carried out, and then a further step of sending an output of step e), or f) if f) is carried out, to the at least one slave shooter vessel. The slave shooter vessel carries out a further step of receiving and using said output.

This is a centralized implementation.

In another embodiment, the invention pertains to a computer program product comprising program code instructions for implementing the above-mentioned method (in any of its different embodiments) when said program is executed on a computer or a processor.

In another embodiment, the invention pertains to a non-transitory computer-readable carrier medium, storing a program which, when executed by a computer or a processor causes the computer or the processor to carry out the above-mentioned method (in any of its different embodiments).

In another embodiment, the invention pertains to a multi-vessel seismic system comprising a scheduler shooter vessel and at least one slave shooter vessel, wherein said system comprises the following means for managing shots, which are integrated in said scheduler shooter vessel and/or in said at least one slave shooter vessel:

means for computing, for each said slave shooter vessel, a series of first theoretical shot times, as a function of a speed value of the scheduler shooter vessel and shot points associated to the scheduler shooter vessel, each first theoretical shot time being associated to one of the next shots of the scheduler shooter vessel;

means for computing, as a function of a speed value of the slave shooter vessel and shot points associated to the slave shooter vessel, a series of second theoretical shot times each associated to one of the next shots of the slave shooter vessel;

means for computing, as a function of the series of first theoretical shot times, a series of interpolated virtual shot times comprising at least the interpolated virtual shot times associated to the shots immediately before and after the next shots of the slave shooter vessel;

means for computing, as a function of the series of first theoretical shot times, the series of interpolated virtual shot times and a minimum shot time interval, shooting time windows each associated to one of the next shots of the slave shooter vessel;

means for selecting, which operates as follows, for each next shot of the slave shooter vessel:

if the associated second theoretical shot time is in the associated shooting time window, the means for selecting select as predicted shot time the associated second theoretical shot time;

otherwise, the means for selecting select as predicted shot time the border of the associated shooting time window which is the closest from the associated second theoretical shot time.

Advantageously, the multi-vessel seismic system comprises means for implementing the steps of the method as described above, in any of its various embodiments.

4. LIST OF FIGURES

Other features and advantages of embodiments of the invention shall appear from the following description, given by way of an indicative and non-exhaustive examples and from the appended drawings, of which:

FIG. 1, already discussed in relation to the prior art, shows an ideal scenario for managing shots in a multi-vessel seismic system comprising several shooter vessels;

FIG. 2A to 2D, already discussed in relation to the prior art, illustrate a first known method to avoid shot overlap;

FIG. 3A to 3C, already discussed in relation to the prior art, illustrate a second known method to avoid shot overlap;

FIG. 4, already discussed in relation to the prior art, shows a simplified example of wide azimuth preplot;

5. DETAILED DESCRIPTION

The invention relates to a method for managing shots in a multi-vessel seismic system comprising several shooter vessels: a scheduler shooter vessel and at least one slave shooter vessel.

Figure 5:
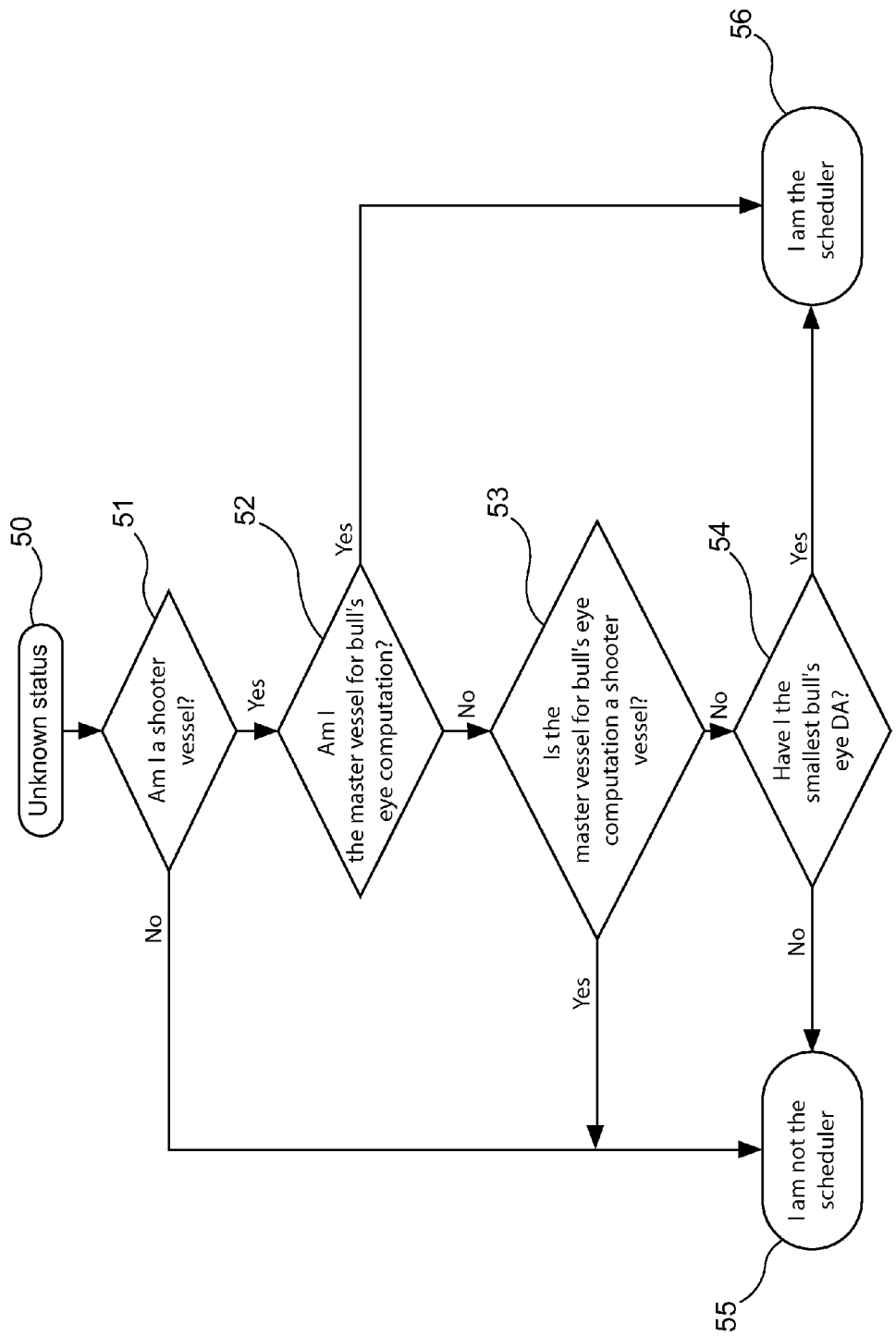
FIG. 5 is a flowchart of a particular embodiment of an algorithm for defining the scheduler shooter vessel.

Referring now to FIG. 5, we present a particular embodiment of an algorithm for defining the scheduler shooter vessel. This algorithm is executed by each vessel (from a unknown status, in step 50), to enable it to know if it is the scheduler shooter vessel.

In a test step 51, the vessel wonders if it is a shooter vessel. In case of negative answer in test step 51, the vessel decides, in step 55, it is not the scheduler shooter vessel. In case of affirmative answer in test step 51, the vessel proceeds with test step 52 in which it wonders if it is the master speed vessel (i.e. the master vessel for bull's eye computation).

In case of affirmative answer in test step 52, the vessel decides, in step 56, it is the scheduler shooter vessel. In case of negative answer in test step 52, the vessel proceeds with test step 53 in which it wonders if the master speed vessel (i.e. the master vessel for bull's eye computation) is a shooter vessel.

In case of affirmative answer in test step 53, the vessel decides, in step 55, it is not the scheduler shooter vessel. In case of negative answer in test step 53, the vessel proceeds with test step 54 in which it wonders if it has the smallest "bull's eye distance along" (BE DA).

In case of negative answer in test step 54, the vessel decides, in step 55, it is not the scheduler shooter vessel. In case of affirmative answer in test step 54, the vessel decides, in step 56, it is the scheduler shooter vessel.

In other words, if the master speed vessel is a shooter vessel, it is the scheduler shooter vessel. Otherwise, the scheduler shooter vessel is the shooter vessel having the smallest "bull's eye distance along" (BE DA).

Figure 6:
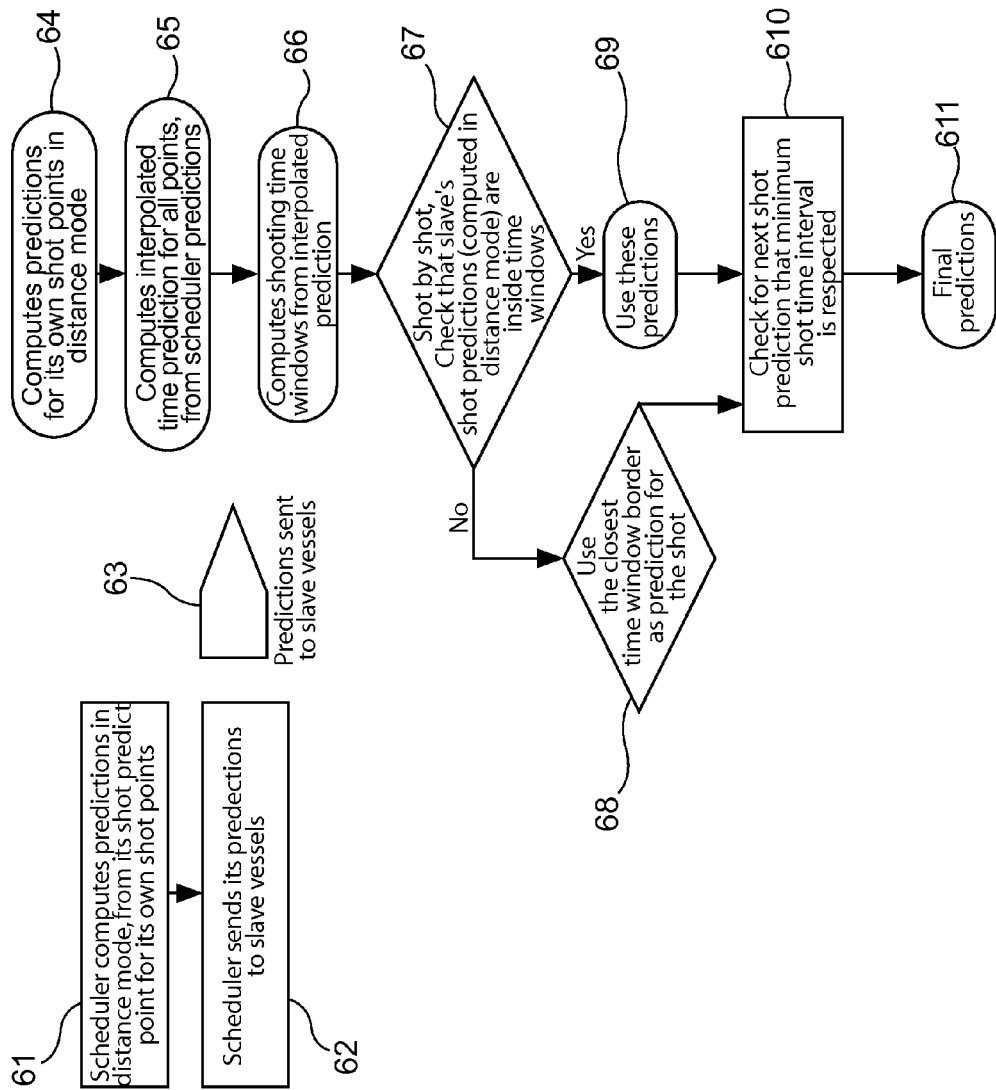
FIG. 6 is a flowchart of a shot management method according to a particular embodiment of the invention, the left part being implemented by the scheduler shooter vessel and the right part by each slave shooter vessel.
Figure 7:
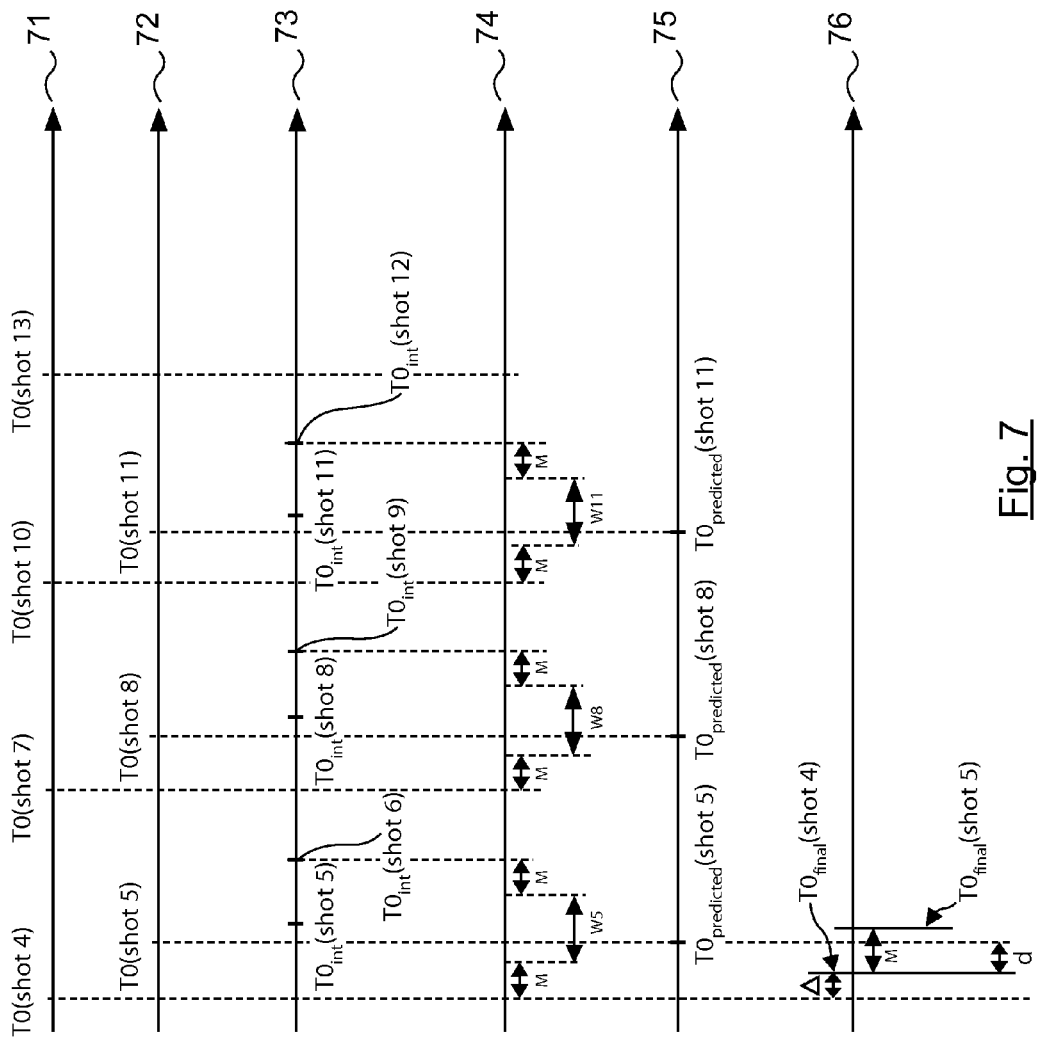
FIG. 7 shows several timing diagrams, illustrating the operation of the shot management method of FIG. 6, with the example of wide azimuth preplot of FIG. 4.

Referring now to FIGS. 6 and 7, we present a shot management method according to a particular embodiment of the invention.

We present first the left part (steps 61-62), which is implemented by the scheduler shooter vessel V1.

In a step 61, the scheduler shooter vessel computes a series of first predictions, comprising first theoretical shot times associated to its next shot points. The number of first theoretical shot times in this series is either predetermined or depends on the speed of the scheduler shooter vessel.

In the timing diagram referenced 71 in FIG. 7, these first theoretical shot times are noted: T0(shot 4), T0(shot 7), T0(shot 10), T0(shot 13), etc.

As detailed above, the first theoretical shot time T0 associated with a given shot point SP is computed according to the following formula (calculation in distance mode):

$$T0 = (DA(SP,PP)/SA(PP)) + \text{current time}$$

with:
SA(PP) the projection, on the sail line of the scheduler shooter vessel, of the speed of a given predict point PP (i.e. a reference point) of the scheduler shooter vessel V1 or of any equipment associated with it (e.g. a reference point of the seismic source S1);
DA(SP,PP) the distance between the given shot point SP and the given predict point PP, projected on the sail line of the scheduler shooter vessel.

In a step 62, the scheduler shooter vessel sends this series of first predictions (symbolized by the arrow referenced 63) to the slave shooter vessel, and also to the listener vessels.

Steps 61 and 62 are carried out iteratively, resulting in the successive sending, via a radio link, of a plurality of series of first theoretical shot times, each series being associated to the next shot points of the scheduler shooter vessel. The successive series are updated successively in time.

In particular embodiment, if the scheduler shooter vessel detects the radio link is unusable, it ceases to generate new updated series of first theoretical shot times and performs its next shots according to a last generated series of first theoretical shot times, until the radio link is usable again.

We present now the right part of FIG. 6 (steps 64-611), which is implemented by each slave shooter vessel. In the following description, we consider as an example the case of the slave shooter vessel V2.

In a step 64, the slave shooter vessel V2 computes a series of second predictions, comprising second theoretical shot times associated to its next shot points.

In the timing diagram referenced 72 in FIG. 7, these second theoretical shot times are noted: T0(shot 5), T0(shot 8), T0(shot 11), etc.

The number of second theoretical shot times in this series is either predetermined or depends on the speed of the slave shooter vessel.

In the aforesaid formula (calculation in distance mode), the predict point PP (used to compute DA and SA) is now the reference point of the slave shooter vessel V2 or of any equipment associated with it (e.g. a reference point of the seismic source S2).

Also in step 64, the slave shooter vessel V2 computes its "bull's eye" (BE) and its "bull's eye distance along" (BE DA). In fact, each slave shooter vessel computes its own BE and BE DA (not the master speed vessel, for which the BE DA is null by definition).

Each slave shooter vessel sends the results of its calculations (series of second theoretical shot times, BE and BE DA) to the other vessels.

In a step 65, the slave shooter vessel V2 computes, as a function of the series of first theoretical shot times (sent by the scheduler shooter vessel), a (reduced) series of interpolated virtual shot times comprising at least the interpolated virtual shot times associated to the shots immediately before and after the next shots of the slave shooter vessel V2.

In an alternative embodiment, the slave shooter vessel V2 computes a (complete) series of interpolated virtual shot times comprising all the interpolated virtual shot times associated to all the next shots of all the slave shooter vessels V2 and V3.

In the timing diagram referenced 73 in FIG. 7, the complete series of interpolated virtual shot times comprises: $T0_{int}$(shot 5), $T0_{int}$(shot 6), $T0_{int}$(shot 8), $T0_{int}$(shot 9), $T0_{int}$(shot 11), $T0_{int}$(shot 12), etc.

In this example, we have:

$$T0_{int}(\text{shot } 5) = T0(\text{shot } 4) + ((1/3)*(T0(\text{shot } 7) - T0(\text{shot } 4)))$$

$$T0_{int}(\text{shot } 6) = T0(\text{shot } 4) + ((2/3)*(T0(\text{shot } 7) - T0(\text{shot } 4)))$$

Same formulas apply for each pair of shots (e.g. shots 8 and 9) of the slave shooter vessels V2 and V3, between two successive shots (e.g. shots 7 and 10) of the scheduler shooter vessel V1.

For the slave shooter vessel V2, the reduced series of interpolated virtual shot times would comprise: $T0_{int}$(shot 6), $T0_{int}$(shot 9), $T0_{int}$(shot 12), etc.

The interpolated virtual shot times, at the beginning and end of lines, are calculated based on the ratio between the theoretical shot spacing and the "speed along" of the scheduler shooter vessel.

In a step 66, the slave shooter vessel V2 computes, as a function of the series of first theoretical shot times (sent by the scheduler shooter vessel V1), the series of interpolated virtual shot times (result of step 65) and the minimum shot time interval (Min STI), shooting time windows each associated to one of the next shots of the slave shooter vessel V2.

In the timing diagram referenced 74 in FIG. 7, the shooting time windows for the slave shooter vessel V2 are noted: W5, W8, W11, etc. In FIG. 7, the minimum shot time interval (Min STI) is noted "M".

For example, the shooting time window W5 is obtained as follows:
  a first (left) border is given by: T0(shot 4)+Min STI
  a second (right) border is given by: $T0_{int}$(shot 6)−Min STI
In a test step 67, for each of its next shots, the slave shooter vessel V2 checks whether the associated second theoretical shot time is in the associated shooting time window, and:
  in case of positive check, the slave shooter vessel V2 goes to step 69 to use as predicted shot time this second theoretical shot time;
  in case of negative check, the slave shooter vessel V2 goes to step 68 to use as predicted shot time the border of the associated shooting time window which is the closest from the associated second theoretical shot time.

For example, in FIG. 7, the second theoretical shot time T0(shot 5) (see timing diagram 72) is in the shooting time window W5, therefore T0(shot 5) is used as predicted shot time, noted $T0_{predicted}$(shot 5), for the shot 5 of the slave shooter vessel V2.

The timing diagram referenced 75 in FIG. 7 shows the predicted shot times for the shots 5, 8 and 9 of the slave shooter vessel V2: $T0_{predicted}$(shot 5), $T0_{predicted}$(shot 8) and $T0_{predicted}$(shot 11).

After step 68 or 69 (depending on the result of the test step 67), the slave shooter vessel V2 goes to steps 610 and 611 when it is in charge of the next shot. In these steps 610 and 611, it checks and changes, if necessary, the predicted shot time for this next shot, so as to meet the minimum shot time interval (Min STI) relative to the previous shot (carried out by another shooter vessel, according to the preplot).

In other words, in the aforesaid example, when a previous shot n−1 has been carried out by the scheduler shooter vessel V1, the slave shooter vessel V2 is in charge of the next shot n and:

- if a time interval d, between a final shot time $T0_{final}$(shot n−1) for the previous shot n−1 (information provided by the scheduler shooter vessel V1) and the predicted shot time $T0_{predicted}$(shot n) for the next shot n, is greater than or equal to the minimum shot time interval (Min STI), the slave shooter vessel V2 uses, as final shot time $T0_{final}$ (shot n) for the next shot n, the predicted shot time $T0_{predicted}$(shot n) for the next shot n;
- otherwise, the slave shooter vessel V2 uses, as final shot time $T0_{final}$(shot n) for the next shot n, the final shot time $T0_{final}$(shot n−1) for the previous shot n−1 plus the minimum shot time interval (Min STI).

In the timing diagram referenced 76 in FIG. 7, we assume, as an example, that for the shot 4 there is an offset Δ between the predicted shot time $T0_{predicted}$(shot 4) and the final shot time $T0_{final}$(shot 4). We also assume that the distance d between $T0_{final}$(shot 4) and $T0_{predicted}$(shot 5) is less than the minimum shot time interval (Min STI). Therefore, the slave shooter vessel V2 uses, as final shot time $T0_{final}$(shot 5) for the next shot 5, the final shot time $T0_{final}$(shot 4) for the previous shot 4 plus the minimum shot time interval (Min STI).

Figure 2A:
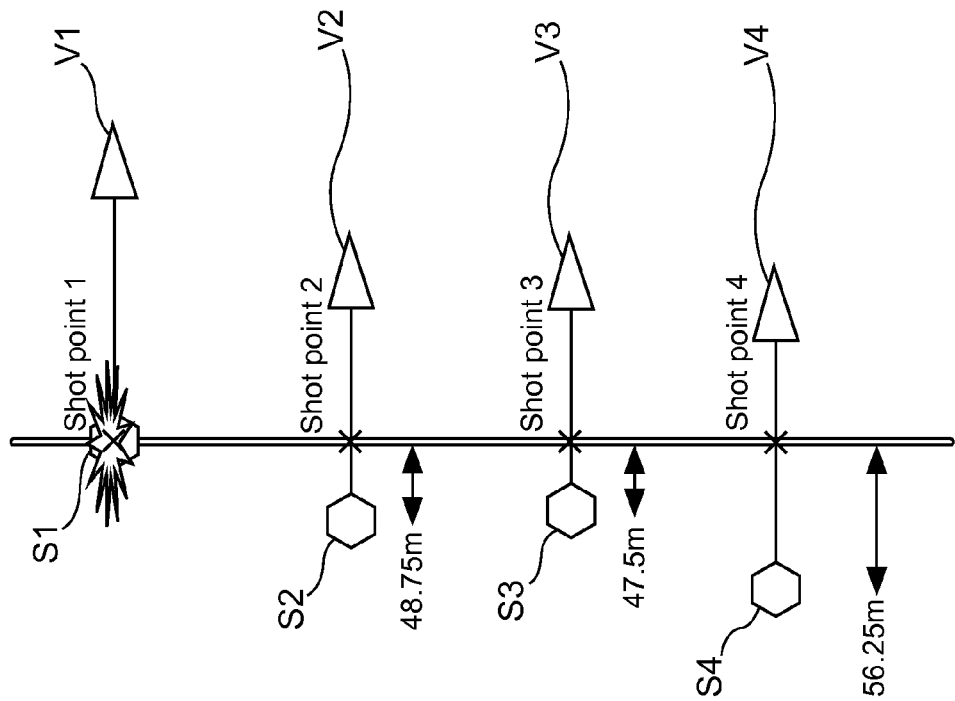
Figure 1:
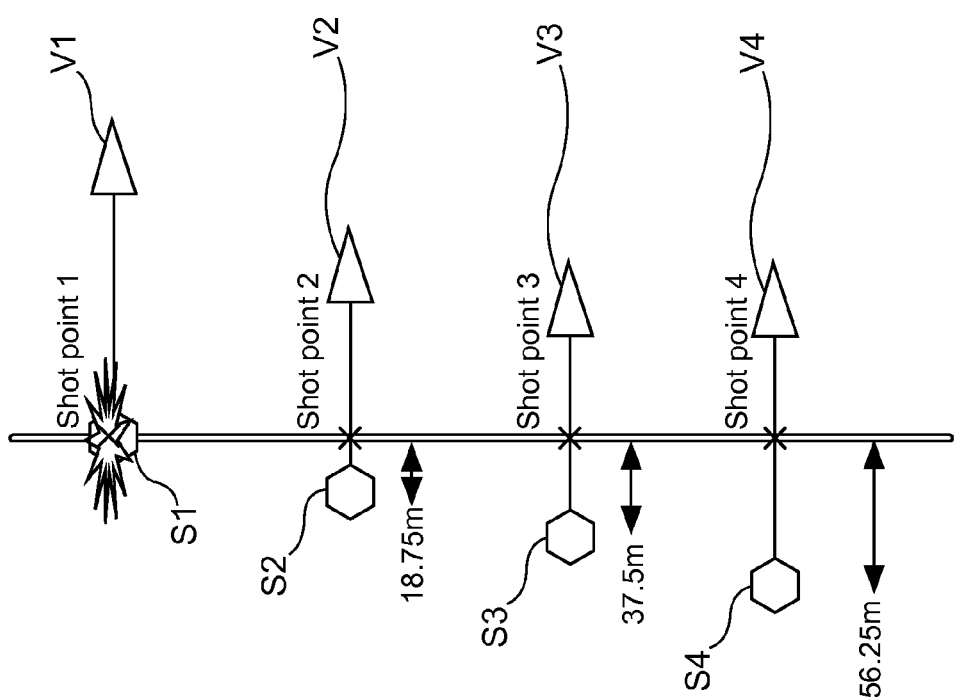
Figure 2C:
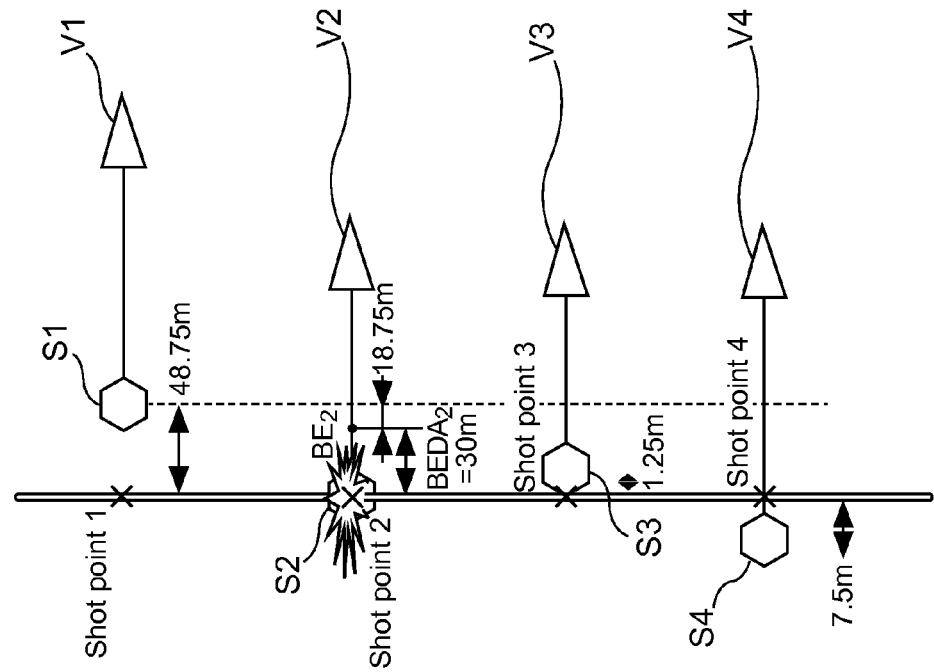
Figure 2B:
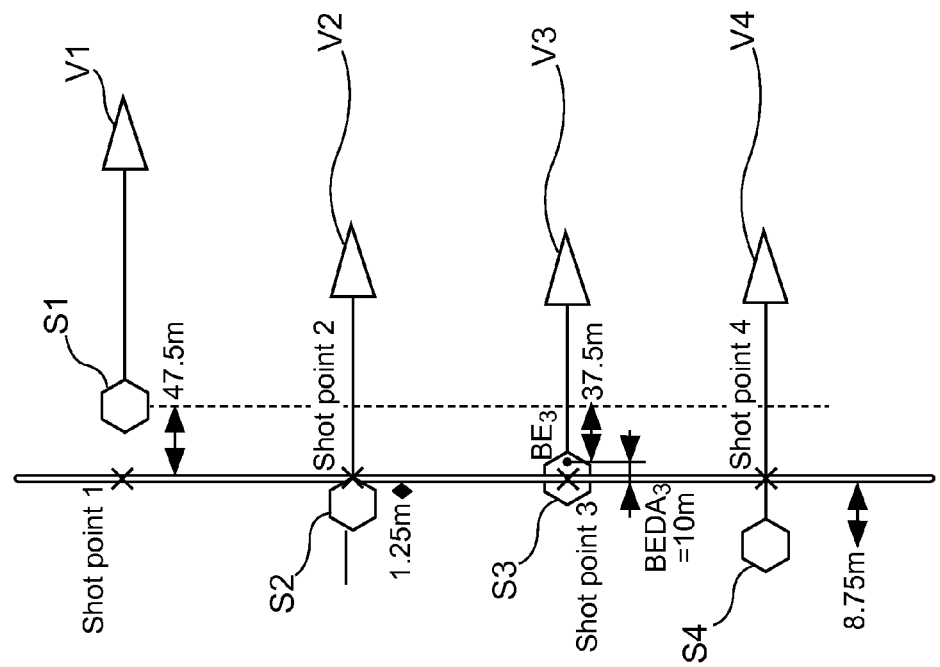
Figure 3A:
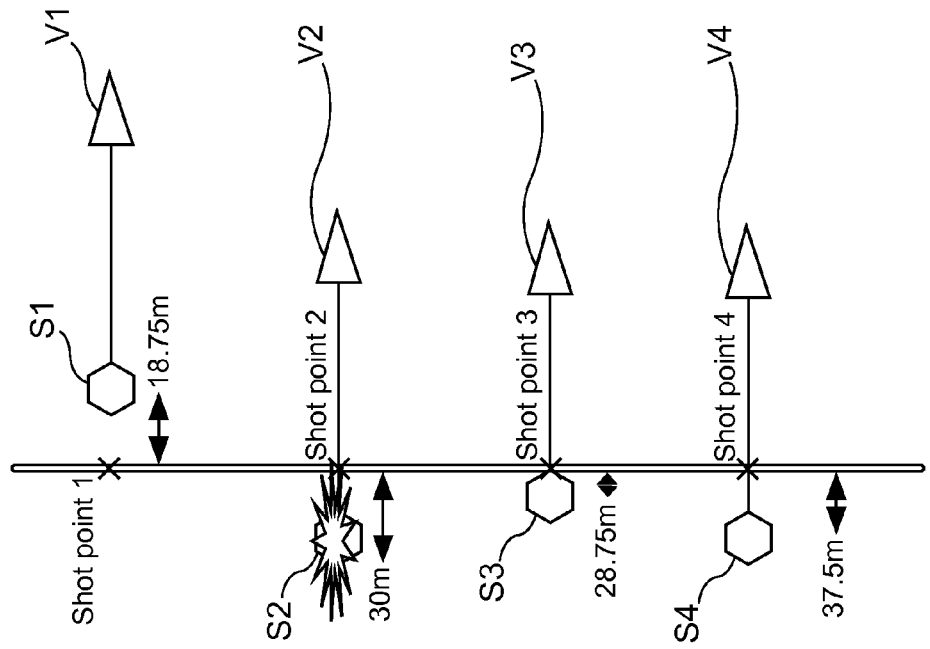
Figure 2D:
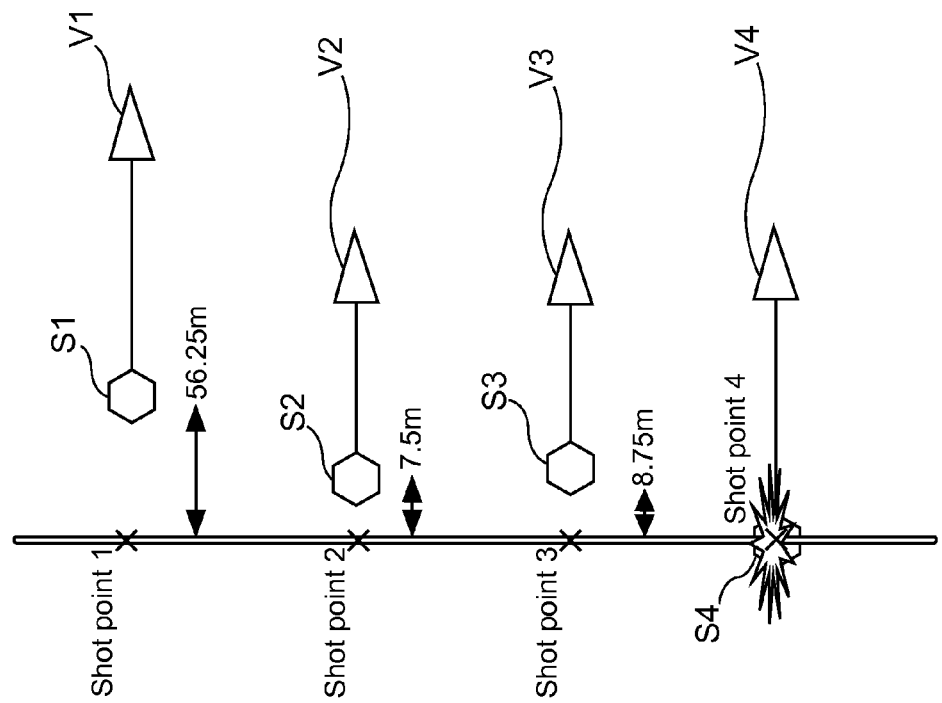
Figure 4:
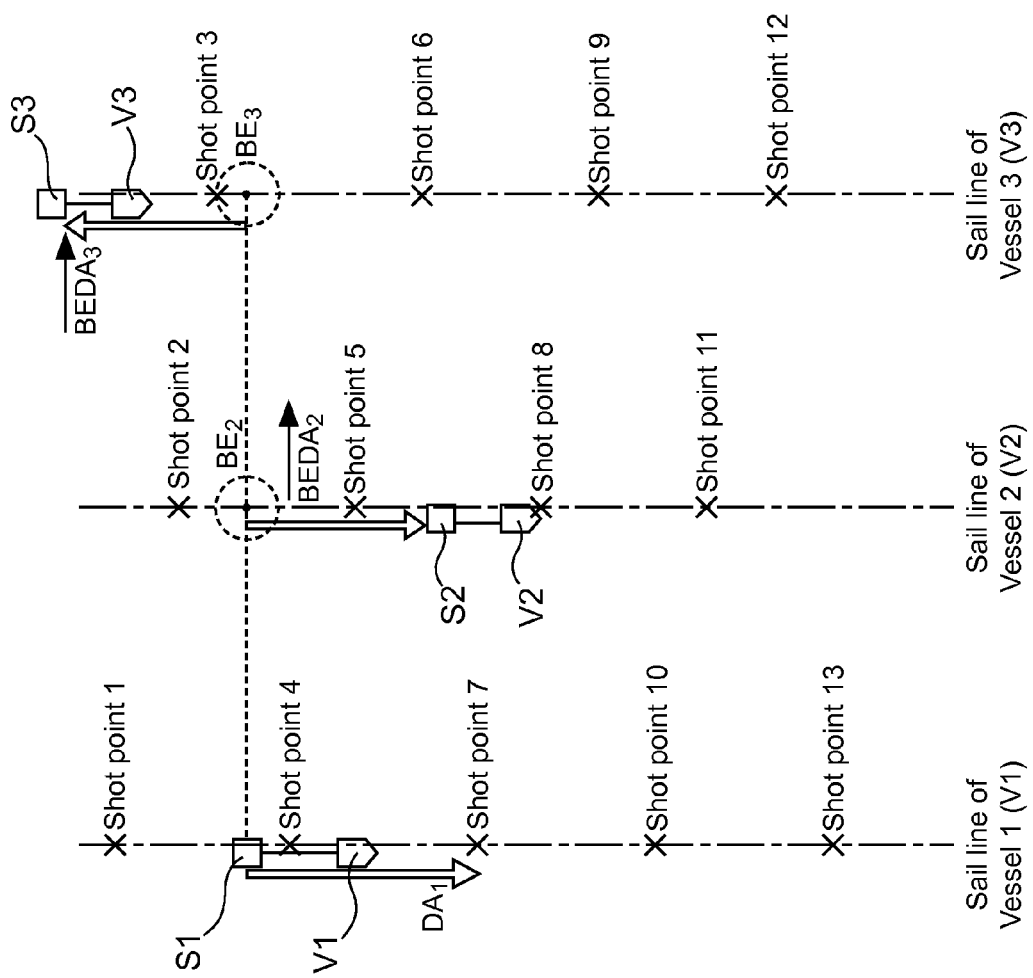
Figure 8:
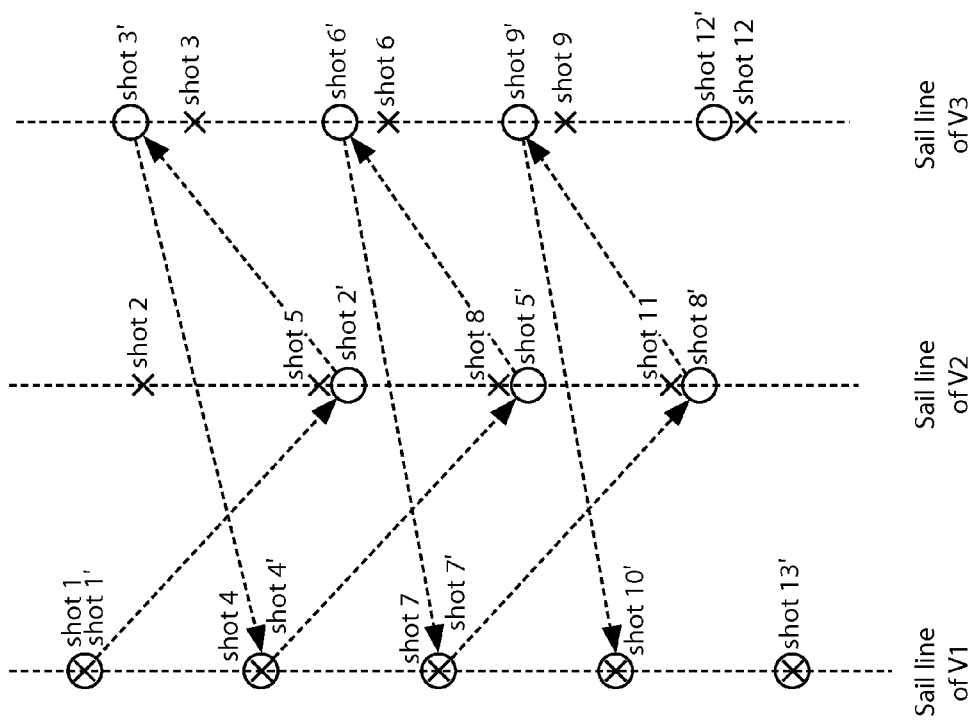
FIG. 8 shows the result of the execution of the shot management method of FIG. 6, with the example of wide azimuth preplot of FIG. 4.

FIG. 8 shows the result of the execution of the shot management method of FIG. 6, with the example of wide azimuth preplot of FIG. 4.

The shot points of the preplot are shown by a cross and noted "shot n", with n the order number of the shot (shots 1, 4, 7, 10, 13 . . . for the scheduler shooter vessel V1, shots 2, 5, 8, 11 . . . for the slave shooter vessel V2, and shots 3, 6, 9, 12 . . . for the slave shooter vessel V3.

The locations of the real shots are shown by a circle and noted "shot n'", with n the order number of the shot.

As can be seen, all the shots are carried out, ensuring minimal coverage. The locations of the real shots of the scheduler shooter vessel V1 are coincident with the shot points of the preplot. In this example, for illustrative purpose, the locations of the real shots of the slave shooter vessel V2 and V3 are shown particularly remote from the shot points of the preplot.

Figure 9:
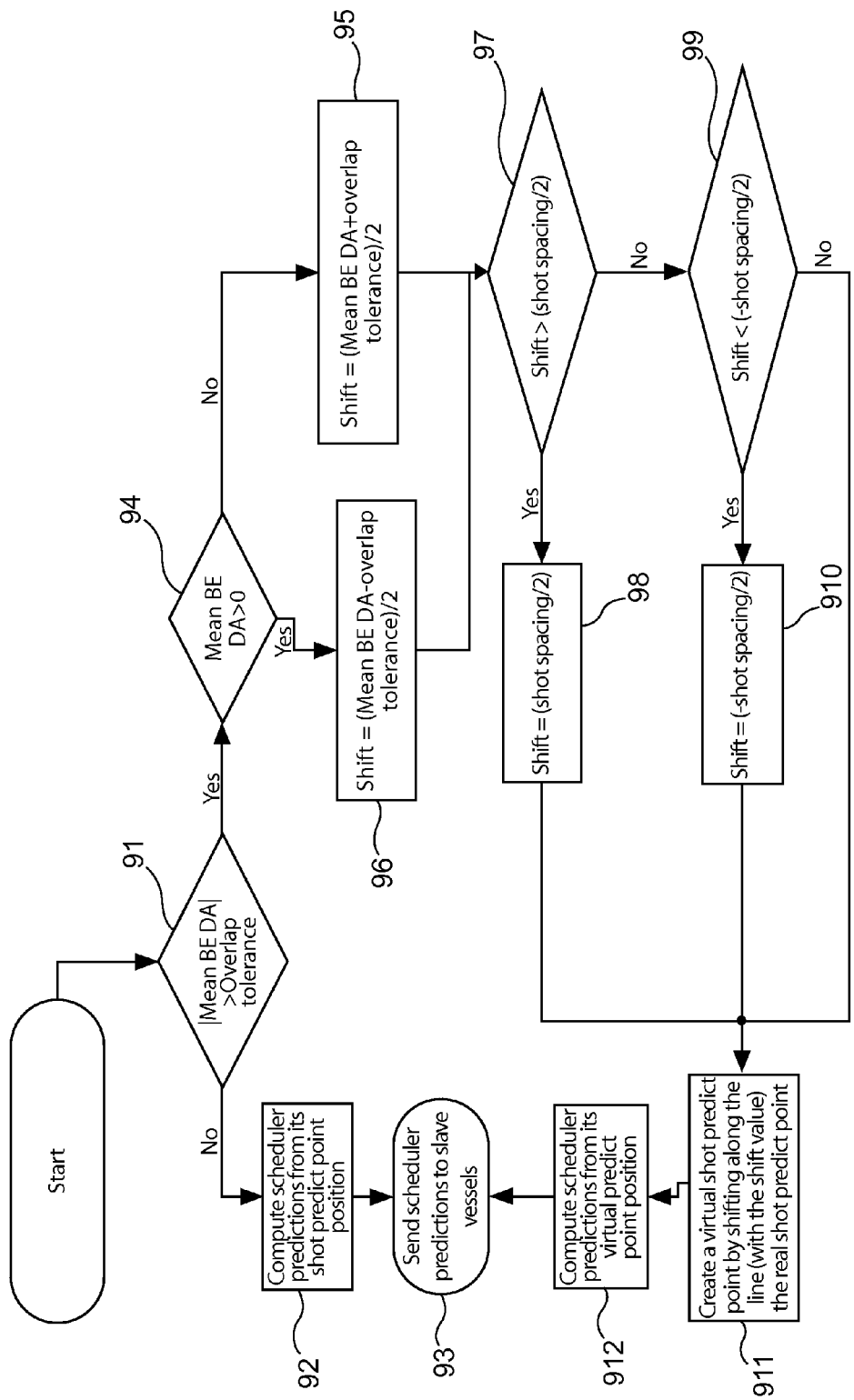
FIG. 9 is a flowchart of an alternative embodiment of the shot management method, for the part implemented by the scheduler shooter vessel (variant of the left part of FIG. 6)

FIG. 9 is a flowchart of an alternative embodiment of the shot management method, for the part implemented by the scheduler shooter vessel (variant of the left part of FIG. 6).

As illustrated in FIG. 8, the locations of the real shots of the slave shooter vessel can be remote from the shot points of the preplot (theoretical shot points). To overcome this problem, in case the slave vessels are not too far from their "bull's eye", an alternative embodiment is proposed, in which the location error on the shot points is shared between the slave shooter vessels and the scheduler shooter vessel. In other words, the basic principle is to introduce an error in the predictions (first theoretical shot times) of the scheduler shooter vessel, in order to shift the shooting time windows of the slave shooter vessels.

The error is introduced by replacing the real shot predict point by a virtual shot predict point, when computing the first theoretical shot times with the aforesaid formula (calculation in distance mode):

$$T0=(DA(SP,PP)/SA(PP))+\text{current time}$$

with PP the predict point (i.e. the reference point) of the scheduler shooter vessel or of any equipment associated with it (e.g. a reference point of the seismic source).

First, in a test step 91, the scheduler shooter vessel must assess whether it is necessary and possible (i.e. not counter-productive) to introduce an error. We assume that, for each shooter vessel, the shot predict point is the same point as the bull's eye reference point. The scheduler shooter vessel checks whether the following condition is true: |Mean BE DA|>"overlap tolerance", with:

- |Mean BE DA| the absolute value of "Mean BE DA", "Mean BE DA" being defined as:
  - the mean value of the "bull's eye distance along" of the slave shooter vessels comprised in said multi-vessel seismic system, if the master speed vessel is a shooter vessel, or
  - the mean value of the "bull's eye distance along" of the slave shooter vessels, minus the "bull's eye distance along" of the scheduler shooter vessel, if the master speed vessel is not a shooter vessel;
- "overlap tolerance"=X−(Y*Z), with:
  - X the theoretical shot spacing;
  - Y the minimum shot time interval;
  - Z the speed along, determined at the real shot predict point of the scheduler shooter vessel.

In case of negative answer in test step 91, the scheduler shooter vessel has not to replace the real shot predict point by a virtual shot predict point. Then, it goes to the step 92 (identical to the step 61 of FIG. 6), and then to the step 93 (identical to the step 62 of FIG. 6).

In case of positive answer in test step 91, the scheduler shooter vessel has to replace the real shot predict point by a virtual shot predict point. Steps 94-910 allow to decide the shift to apply to the real shot predict point, in order to obtain the virtual shot predict point.

In test step 94, the scheduler shooter vessel checks whether "Mean BE DA" is greater than 0.

In case of negative answer in test step 94, the scheduler shooter vessel computes a shift according to the following formula, before going to the step 97:

$$\text{shift}=(\text{"Mean }BE\ DA\text{"}+\text{"overlap tolerance"})/2$$

In case of positive answer in test step 94, the scheduler shooter vessel computes a shift according to the following formula, before going to the step 97:

$$\text{shift}=(\text{"Mean }BE\ DA\text{"}-\text{"overlap tolerance"})/2$$

In test step 97, the scheduler shooter vessel checks whether the shift computed in step 95 or 96 is greater than "theoretical shot spacing"/2.

In case of positive answer in test step 97, the scheduler shooter vessel goes to the step 98 where it changes the shift computed in step 95 or 96 to "theoretical shot spacing"/2, and then goes to the step 911.

In case of negative answer in test step 97, the scheduler shooter vessel goes to the test step 99 where it checks whether the shift computed in step 95 or 96 is lower than −"theoretical shot spacing"/2.

In case of positive answer in test step 99, the scheduler shooter vessel goes to the step 910 where it changes the shift computed in step 95 or 96 to −"theoretical shot spacing"/2, and then goes to the step 911.

In case of negative answer in test step 99, the scheduler shooter vessel keeps the shift computed in step 95 or 96, and goes to the step 911.

In step 911, the scheduler shooter vessel computes the virtual shot predict point, by shifting, along the sail line of the scheduler shooter vessel and with the shift value determined in steps 94-910, the real shot predict point.

In step 912, the scheduler shooter vessel computes a series of first predictions (comprising first theoretical shot times associated to its next shot points), using the virtual shot predict point (instead of the real shot predict point in step 92).

Figure 10:
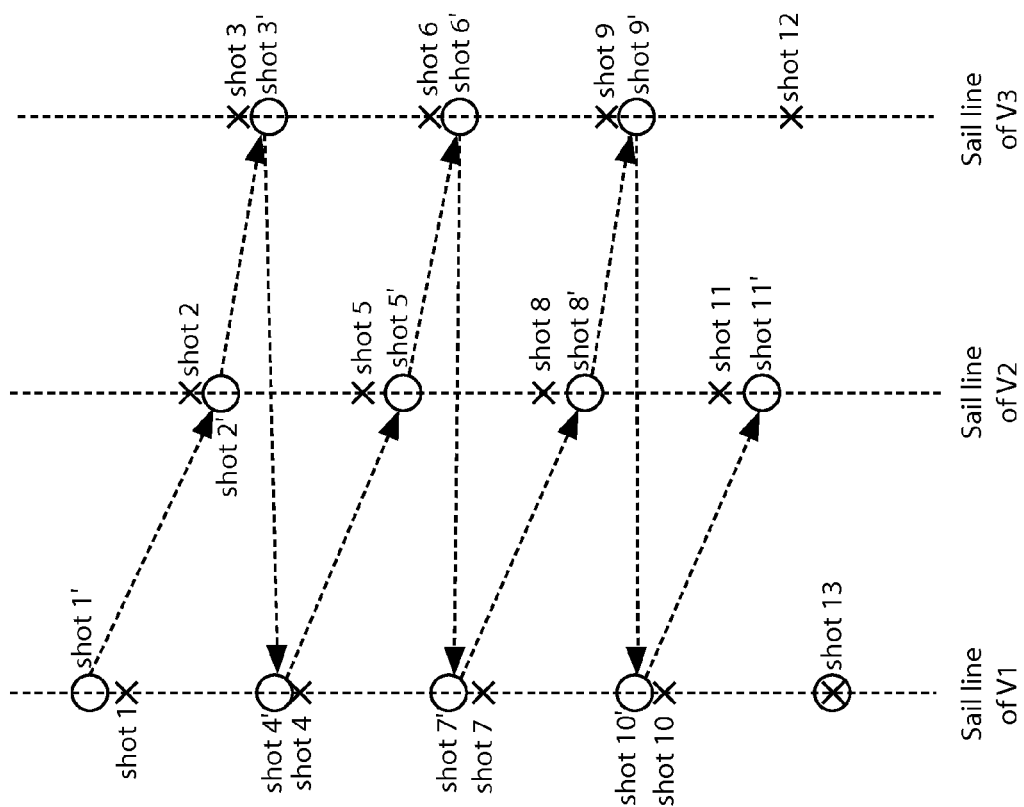
FIG. 10 shows the result of the execution of the shot management method combining the flowchart of FIG. 9 (variant of the left part of FIG. 6) and the flowchart of right part of FIG. 6, with the example of wide azimuth preplot of FIG. 4.

FIG. 10 shows the result of the execution of the shot management method combining the flowchart of FIG. 9 (variant of the left part of FIG. 6) and the flowchart of right part of FIG. 6, with the example of wide azimuth preplot of FIG. 4.

As in FIG. 8, the shot points of the preplot are shown by a cross and noted "shot n", with n the order number of the shot (shots 1, 4, 7, 10, 13 . . . for the scheduler shooter vessel V1, shots 2, 5, 8, 11 . . . for the slave shooter vessel V2, and shots 3, 6, 9, 12 . . . for the slave shooter vessel V3.

The locations of the real shots are shown by a circle and noted "shot n'", with n the order number of the shot.

As can be seen, all the shots are carried out, ensuring minimal coverage. The locations of the real shots of the scheduler shooter vessel V1 are not coincident with the shot points of the preplot (due to the aforesaid shift between the real shot predict point and the virtual shot predict point). In this example, the locations of the real shots of the slave shooter vessel V2 and V3 are close to the shot points of the preplot.

Figure 11:
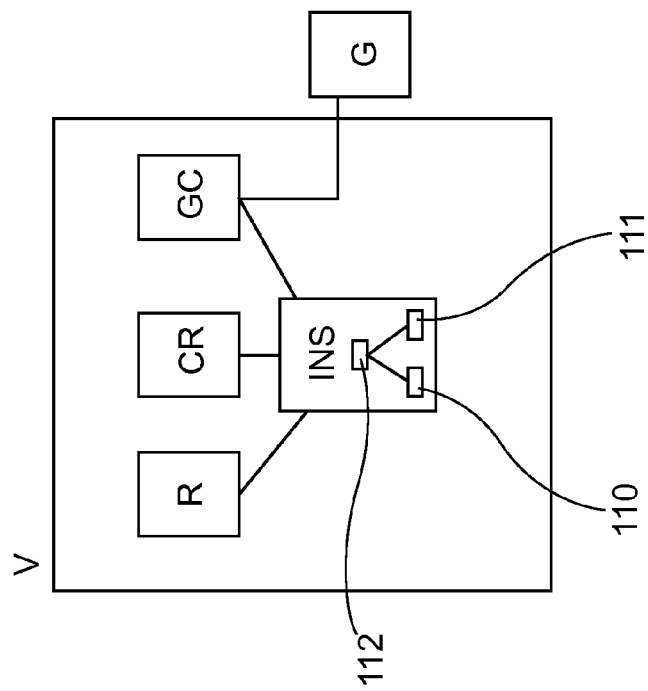
FIG. 11 shows the simplified structure of a shooter vessel (master or slave) according to a particular embodiment of the invention.

FIG. 11 shows the simplified structure of a shooter vessel V (master or slave) according to a particular embodiment of the invention.

The shooter vessel V comprises:
- an integrated navigation system INS;
- a radio communication system R, designed to exchange data with other vessels, via radio link;
- a clock reference CR;
- a seismic source G, comprising for example one or several guns;
- a gun controller GC, able to command the seismic source G and generate shot data. The gun controller GC commands to fire the shot via a binary electrical signal sent by the integrated navigation system INS. When the shot is fired, a binary output of the gun controller GC is used to determine the real time of the shot (also called FTB, for "Field Time Break"). After each shot, the gun controller GC generates information about guns (pressure, activated guns, depth), theses information being aggregated in a "gun header" (also called GH). The gun controller GC provides the integrated navigation system INS with the shot data relating to each shot, i.e. the real time of the shot FTB and the gun header GH.

The integrated navigation system INS comprises a read-only memory (ROM) 110, a random access memory (RAM) 111 and a processor 112. The read-only memory 110 is a non transitory computer-readable carrier medium. It stores executable program code instructions, which are executed by the processor 112 in order to enable implementation of the method described above (method for managing shots in a multi-vessel seismic system comprising several shooter vessels), and for example:
- steps 50-56 of FIG. 5 and steps 61-62 of FIG. 6 (or steps 91-912 of FIG. 9), if the vessel V is the scheduler shooter vessel; or
- steps 50-56 of FIG. 5 and steps 64-611 of FIG. 6, if the vessel V is a slave shooter vessel.

Upon initialization, the aforementioned program code instructions are transferred from the read-only memory 110 to the random access memory 111 so as to be executed by the processor 112. The random access memory 111 likewise includes registers for storing the variables and parameters required for this execution.

All the steps of the above shot management method can be implemented equally well:
- by the execution of a set of program code instructions executed by a reprogrammable computing machine such as a PC type apparatus, a DSP (digital signal processor) or a microcontroller. This program code instructions can be stored in a non-transitory computer-readable carrier medium that is detachable (for example a floppy disk, a CD-ROM or a DVD-ROM) or non-detachable; or
- by a dedicated machine or component, such as an FPGA (Field Programmable Gate Array), an ASIC (Application-Specific Integrated Circuit) or any dedicated hardware component.

At least one embodiment of the disclosure provides a technique for managing shots in a multi-vessel seismic system comprising several shooter vessels, this technique avoiding missed shots, even though the vessels are not well aligned with the preplot.

An embodiment provides a technique of this kind which allows to minimize the "Distance Along" (DA) error on shot locations (as defined above).

An embodiment provides a technique of this kind which avoids shot overlaps.

An embodiment provides a technique of this kind which can continue to operate even in case of temporary loss of radio link between vessels.

An embodiment provides a technique of this kind that is simple to implement and inexpensive.

Although the present disclosure has been described with reference to one or more examples, workers skilled in the art will recognize that changes may be made in form and detail without departing from the scope of the disclosure and/or the appended claims.

The invention claimed is:

1. A method for managing shots in a multi-vessel seismic system comprising a scheduler shooter vessel and at least one slave shooter vessel, said method comprising, for each said slave shooter vessel:
   a) computing a series of first theoretical shot times, as a function of a speed value of the scheduler shooter vessel and shot points associated to the scheduler shooter vessel, each first theoretical shot time being associated to one of the next shots of the scheduler shooter vessel;
   b) computing, as a function of a speed value of the slave shooter vessel and shot points associated to the slave shooter vessel, a series of second theoretical shot times each associated to one of the next shots of the slave shooter vessel;
   c) computing, as a function of the series of first theoretical shot times, a series of interpolated virtual shot times comprising at least the interpolated virtual shot times associated to the shots immediately before and after the next shots of the slave shooter vessel;
   d) computing, as a function of the series of first theoretical shot times, the series of interpolated virtual shot times and a minimum shot time interval, shooting time windows each associated to one of the next shots of the slave shooter vessel; and
   e) for each next shot of the slave shooter vessel:

if the associated second theoretical shot time is in the associated shooting time window, selecting as predicted shot time the associated second theoretical shot time;

otherwise, selecting as predicted shot time the border of the associated shooting time window which is the closest from the associated second theoretical shot time.

2. The method according to claim 1, comprising:
f) when a previous shot n−1 has been carried out and the slave shooter vessel is in charge of a next shot n:
if a time interval, between a final shot time for the previous shot n−1 and the predicted shot time for the next shot n, is greater than or equal to the minimum shot time interval, selecting, as final shot time for the next shot n of the slave shooter vessel, the predicted shot time for the next shot n;
otherwise, selecting, as final shot time for the next shot n of the slave shooter vessel, the final shot time for the previous shot n−1 plus the minimum shot time interval.

3. The method according to claim 1, said multi-vessel seismic system comprising a master speed vessel, wherein:
if the master speed vessel is a shooter vessel, the scheduler shooter vessel is the master speed vessel;
otherwise, the scheduler shooter vessel is the shooter vessel having the smallest bull's eye distance along.

4. The method according to claim 1, wherein, if a determined condition is verified, the method further comprises:
computing a virtual shot predict point which is used instead of a real shot predict point, in step a), to compute the series of first theoretical shot times.

5. The method according to claim 4, said multi-vessel seismic system comprising a master speed vessel, wherein the determined condition is:
|Mean BE DA|>"overlap tolerance", with:
|Mean BE DA| the absolute value of "Mean BE DA", "Mean BE DA" being defined as:
the mean value of the "bull's eye distance along" of the slave shooter vessels comprised in said multi-vessel seismic system, if the master speed vessel is a shooter vessel, or
the mean value of the "bull's eye distance along" of the slave shooter vessels, minus the "bull's eye distance along" of the scheduler shooter vessel, if the master speed vessel is not a shooter vessel;
"overlap tolerance"=X−(Y*Z), with:
X a theoretical shot spacing;
Y the minimum shot time interval;
Z the speed along, determined at the real shot predict point of the scheduler shooter vessel.

6. The method according to claim 1, wherein the scheduler shooter vessel carries out step a) and then a further step a') of sending the series of first theoretical shot times to the at least one slave shooter vessel, and wherein the slave shooter vessel carries out a further step b') of receiving the series of first theoretical shot times and then said step b) to e), and f) if f) is carried out.

7. The method according to claim 6, wherein the scheduler shooter vessel carries out the steps a) and a') iteratively, resulting in the successive sending to the slave shooter vessel, via a radio link, of a plurality of series of first theoretical shot times which are updated successively in time.

8. The method according to claim 7, wherein, if the scheduler shooter vessel detects the radio link is unusable, the scheduler shooter vessel ceases to generate new updated series of first theoretical shot times and performs the next shots according to a last generated series of first theoretical shot times, until the radio link is usable again.

9. The method according to claim 1, wherein the scheduler shooter vessel carries out steps a) to e), and f) if f) is carried out, and then a further step of sending an output of step e), or f) if f) is carried out, to the at least one slave shooter vessel, and wherein the slave shooter vessel carries out a further step of receiving and using said output.

10. A non-transitory computer-readable carrier medium storing a program which, when executed by a computer or a processor, causes the computer or the processor to carry out a method for managing shots in a multi-vessel seismic system comprising a scheduler shooter vessel and at least one slave shooter vessel, said method comprising, for each said slave shooter vessel:
a) computing a series of first theoretical shot times, as a function of a speed value of the scheduler shooter vessel and shot points associated to the scheduler shooter vessel, each first theoretical shot time being associated to one of the next shots of the scheduler shooter vessel;
b) computing, as a function of a speed value of the slave shooter vessel and shot points associated to the slave shooter vessel, a series of second theoretical shot times each associated to one of the next shots of the slave shooter vessel;
c) computing, as a function of the series of first theoretical shot times, a series of interpolated virtual shot times comprising at least the interpolated virtual shot times associated to the shots immediately before and after the next shots of the slave shooter vessel;
d) computing, as a function of the series of first theoretical shot times, the series of interpolated virtual shot times and a minimum shot time interval, shooting time windows each associated to one of the next shots of the slave shooter vessel; and
e) for each next shot of the slave shooter vessel:
if the associated second theoretical shot time is in the associated shooting time window, selecting as predicted shot time the associated second theoretical shot time;
otherwise, selecting as predicted shot time the border of the associated shooting time window which is the closest from the associated second theoretical shot time.

11. A multi-vessel seismic system comprising:
a scheduler shooter vessel;
at least one slave shooter vessel; and
the following means for managing shots, which are integrated in said scheduler shooter vessel and/or in said at least one slave shooter vessel:
means for computing, for each said slave shooter vessel, a series of first theoretical shot times, as a function of a speed value of the scheduler shooter vessel and shot points associated to the scheduler shooter vessel, each first theoretical shot time being associated to one of the next shots of the scheduler shooter vessel;
means for computing, as a function of a speed value of the slave shooter vessel and shot points associated to the slave shooter vessel, a series of second theoretical shot times each associated to one of the next shots of the slave shooter vessel;
means for computing, as a function of the series of first theoretical shot times, a series of interpolated virtual shot times comprising at least the interpolated virtual shot times associated to the shots immediately before and after the next shots of the slave shooter vessel;

means for computing, as a function of the series of first theoretical shot times, the series of interpolated virtual shot times and a minimum shot time interval, shooting time windows each associated to one of the next shots of the slave shooter vessel; and means for selecting, which operates as follows, for each next shot of the slave shooter vessel:
- if the associated second theoretical shot time is in the associated shooting time window, the means for selecting select as predicted shot time the associated second theoretical shot time;
- otherwise, the means for selecting select as predicted shot time the border of the associated shooting time window which is the closest from the associated second theoretical shot time.

* * * * *